(12) United States Patent
Miyashita

(10) Patent No.: US 9,881,227 B2
(45) Date of Patent: Jan. 30, 2018

(54) IMAGE PROCESSING APPARATUS AND METHOD

(71) Applicant: OLYMPUS CORPORATION, Tokyo (JP)

(72) Inventor: Naoyuki Miyashita, Tokorozawa (JP)

(73) Assignee: OLYMPUS CORPORATION, Tokyo (JP)

( * ) Notice: Subject to any disclaimer, the term of this patent is extended or adjusted under 35 U.S.C. 154(b) by 111 days.

(21) Appl. No.: 14/589,038

(22) Filed: Jan. 5, 2015

(65) Prior Publication Data

US 2015/0117789 A1 Apr. 30, 2015

Related U.S. Application Data

(63) Continuation of application No. PCT/JP2013/054210, filed on Feb. 20, 2013.

(30) Foreign Application Priority Data

Jul. 11, 2012 (JP) ................................ 2012-155539

(51) Int. Cl.
*G06K 9/46* (2006.01)
*G06K 9/62* (2006.01)
*G06T 7/44* (2017.01)

(52) U.S. Cl.
CPC ......... *G06K 9/4604* (2013.01); *G06K 9/4671* (2013.01); *G06K 9/6202* (2013.01);
(Continued)

(58) Field of Classification Search
None
See application file for complete search history.

(56) References Cited

U.S. PATENT DOCUMENTS 8,351,707 B2 * 1/2013 Sakamoto ............ G06K 9/3283
382/190
8,831,336 B2 * 9/2014 Barnum ................ G06T 7/0075
382/103

(Continued)

FOREIGN PATENT DOCUMENTS

CN 101299242 B * 8/2010
JP H11-15951 A 1/1999
(Continued)

OTHER PUBLICATIONS

English translation of International Preliminary Report on Patentability together with the Written Opinion dated Jan. 22, 2015 received in related International Application No. PCT/JP2013/054210.

(Continued)

*Primary Examiner* — Michelle M Hausmann
(74) *Attorney, Agent, or Firm* — Scully, Scott, Murphy & Presser, P.C.

(57) ABSTRACT

An image analysis unit of an image processing apparatus acquires a distribution condition of feature points in an entire input image and in each of a plurality of small regions in the input image. A target point number setting unit sets a target point number for each small region based on the distribution condition of feature points in the entire input image. An expected point number setting unit sets an expected point number for each small region based on the distribution condition of feature points in the small region. A comparison unit compares the target point number and the expected point number. A sensitivity setting unit sets detection sensitivity based on the comparison result. A feature point detection unit performs feature point detection according to the detection sensitivity.

10 Claims, 11 Drawing Sheets

(52) U.S. Cl.
CPC .............. *G06K 9/6211* (2013.01); *G06T 7/44* (2017.01); *G06T 2207/10004* (2013.01)

(56) References Cited

U.S. PATENT DOCUMENTS

| | | | |
|---|---|---|---|
| 2003/0161608 A1* | 8/2003 | Nishijima | H04N 1/2307 386/240 |
| 2004/0228508 A1* | 11/2004 | Shigeta | G06K 9/00026 382/124 |
| 2007/0080851 A1* | 4/2007 | Shapira | G01J 3/2823 342/53 |
| 2009/0080783 A1* | 3/2009 | Hirohata | G06K 9/00577 382/218 |
| 2010/0296736 A1* | 11/2010 | Shiiyama | G06K 9/6211 382/195 |
| 2011/0002544 A1 | 1/2011 | Oshima | |
| 2011/0222774 A1* | 9/2011 | Hong | G06K 9/4671 382/190 |
| 2011/0242319 A1* | 10/2011 | Miyajima | G01C 21/3647 348/148 |
| 2012/0249536 A1* | 10/2012 | Sutou | H04N 13/0011 345/419 |
| 2013/0148896 A1* | 6/2013 | Ihara | G06K 9/00442 382/195 |
| 2013/0285908 A1* | 10/2013 | Kaplan | G06F 3/011 345/158 |

FOREIGN PATENT DOCUMENTS

| | | | |
|---|---|---|---|
| JP | 2002216130 A | * | 8/2002 |
| JP | 2004-138563 A | | 5/2004 |
| JP | 2007-141222 A | | 6/2007 |
| JP | 2011-13890 A | | 1/2011 |
| JP | 2012-043403 A | | 3/2012 |
| WO | WO 2012/096163 A1 | | 7/2012 |

OTHER PUBLICATIONS

International Search Report dated Apr. 16, 2013 issued in PCT/JP2013/054210.
Harris, Chris et al., "A Combined Corner and Edge Detector", Proceedings of Fourth Alvey Vision Conference (1988), pp. 147-151.
Lowe, David G., "Object Recognition from Local Scale-Invariant Features", Proceedings of IEEE International Conference on Computer Vision (ICCV) (1999), pp. 1150-1157.

* cited by examiner

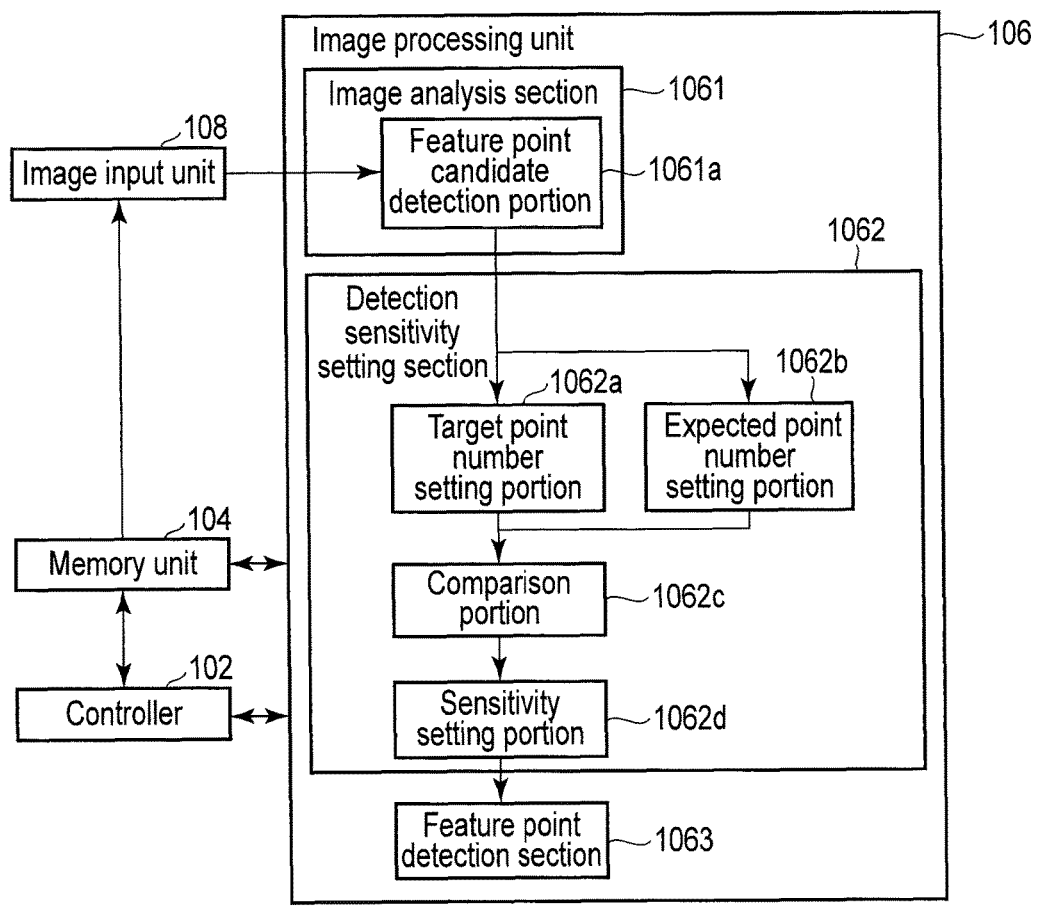
F I G. 1

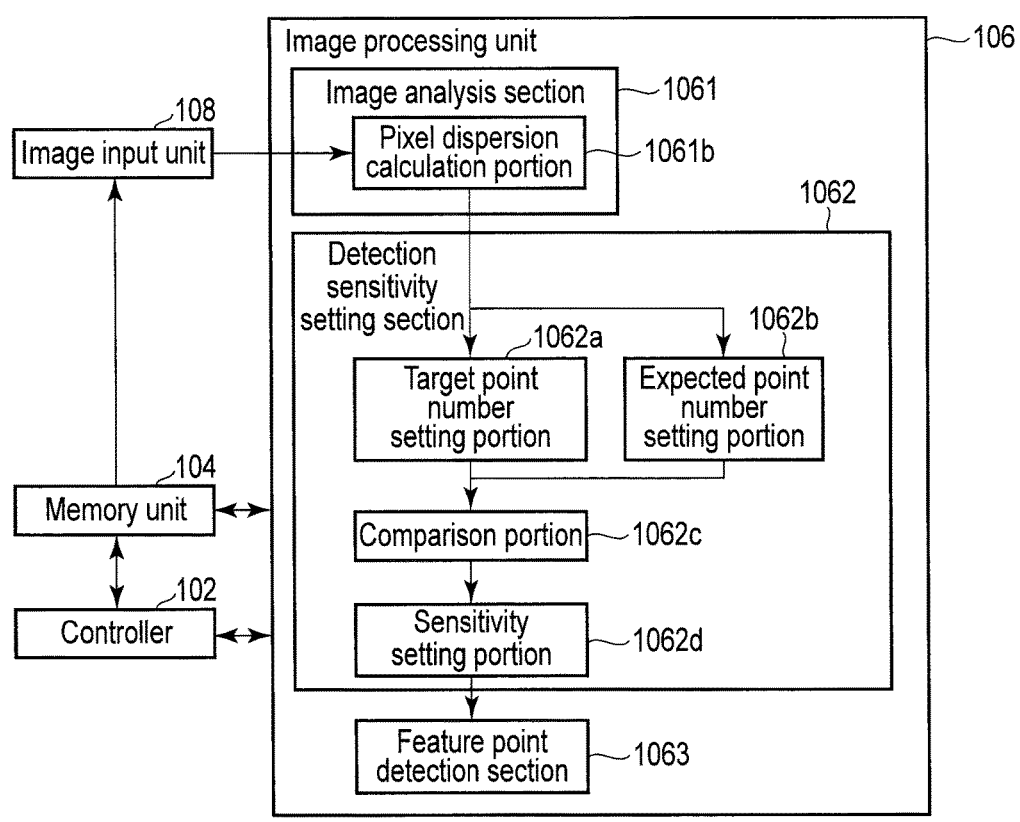
F I G. 6

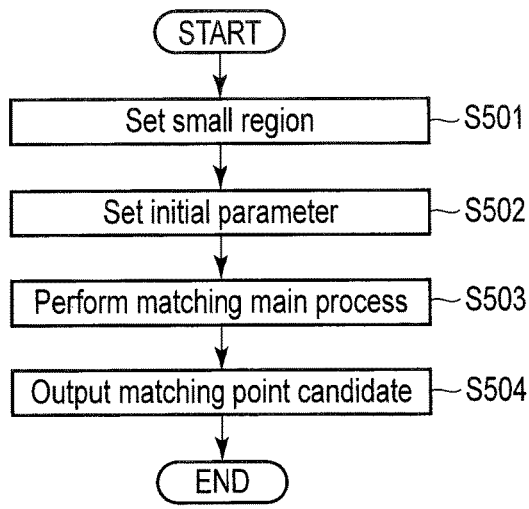
F I G. 11
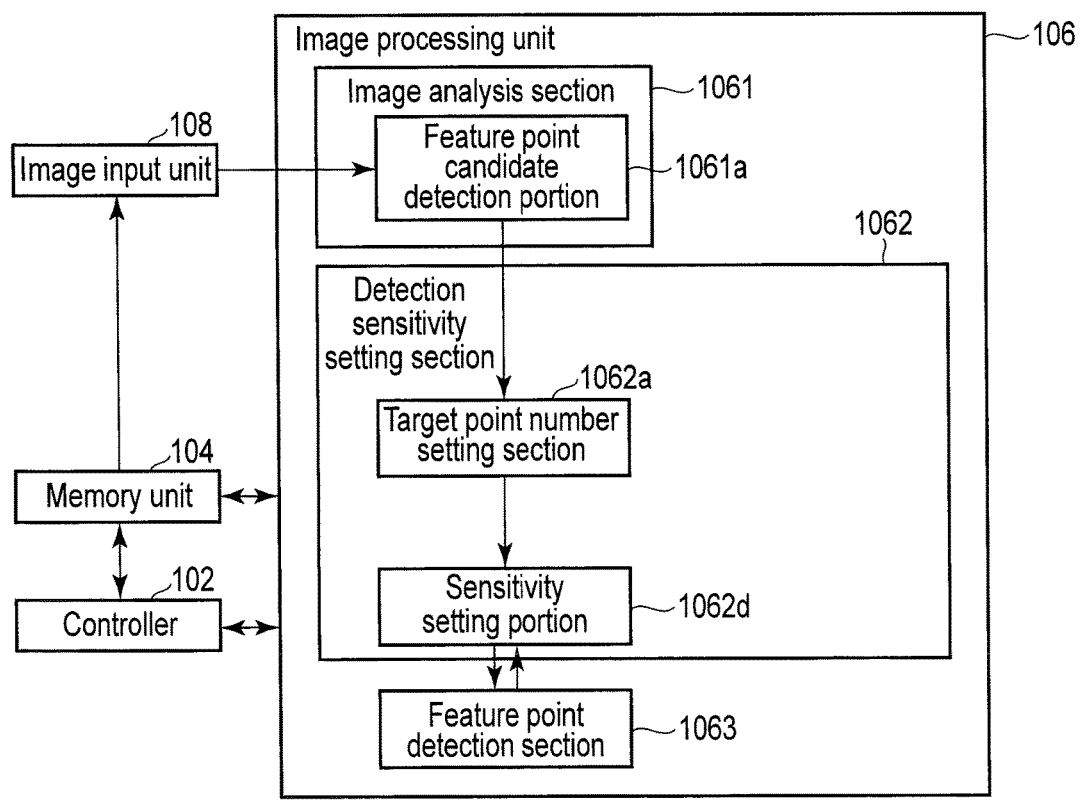
F I G. 12

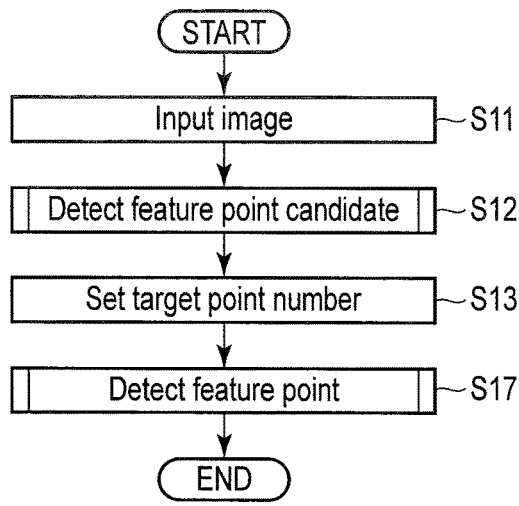
F I G. 13
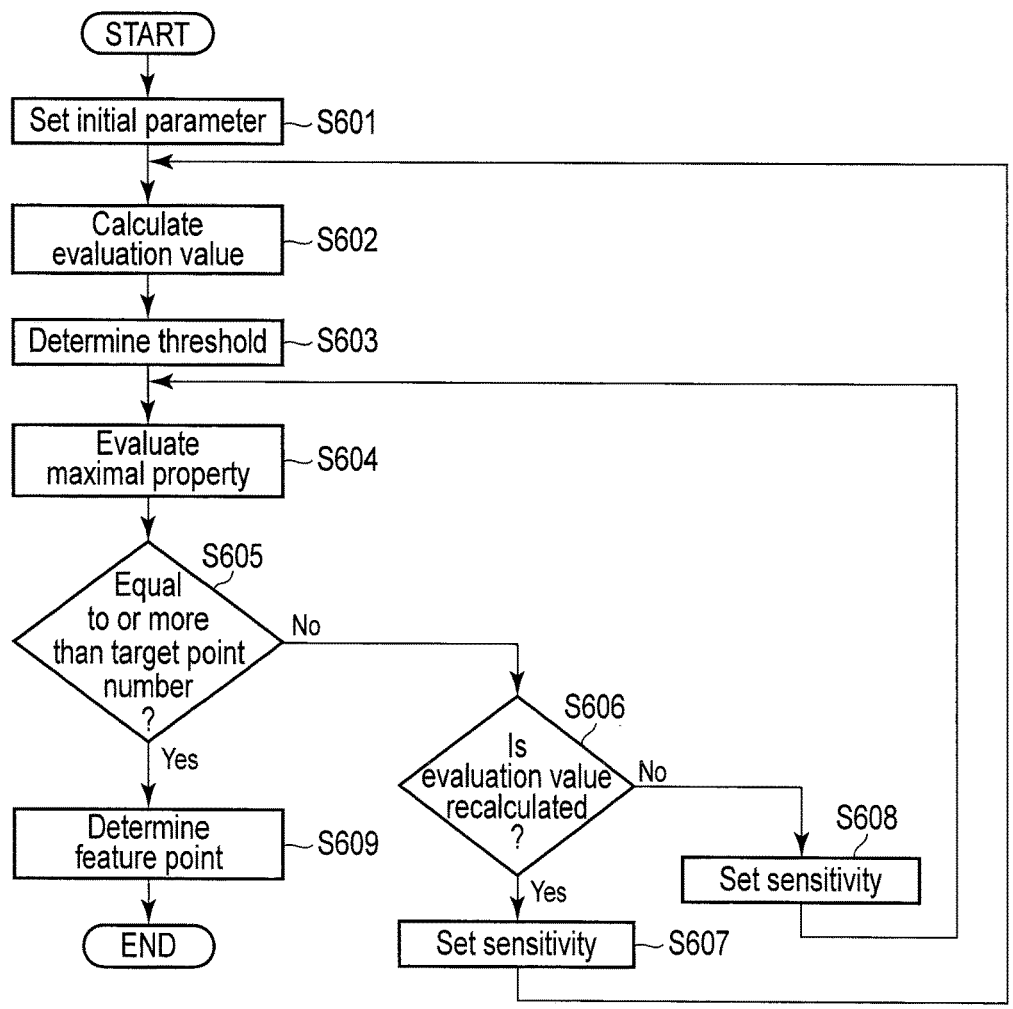
F I G. 14

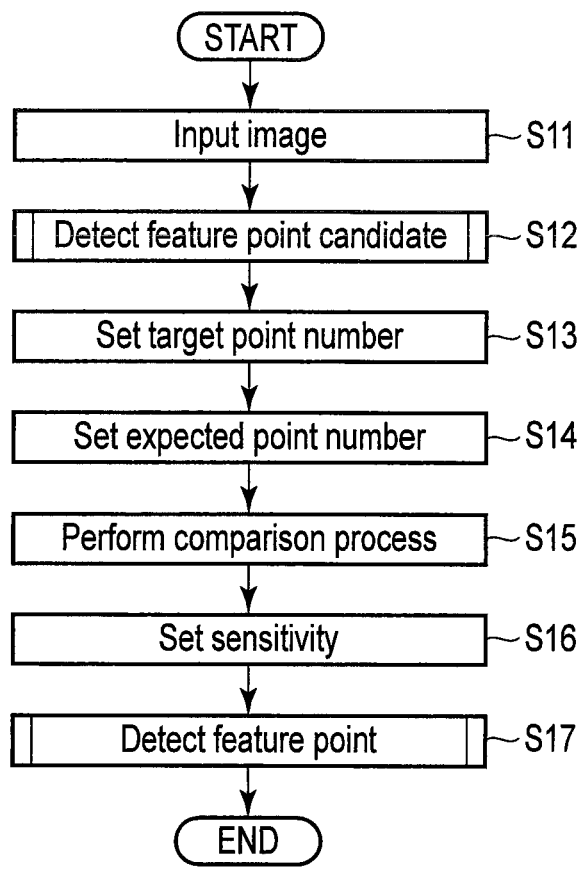
F I G. 16

IMAGE PROCESSING APPARATUS AND METHOD

CROSS-REFERENCE TO RELATED APPLICATIONS

This application is a Continuation Application of PCT Application No. PCT/JP2013/054210, filed Feb. 20, 2013 and based upon and claiming the benefit of priority from the prior Japanese Patent Application No. 2012-155539, filed Jul. 11, 2012, the entire contents of both of which are incorporated herein by reference.

BACKGROUND OF THE INVENTION

1. Field of the Invention

The present invention relates to an image processing apparatus and method which detect a feature point or perform feature point matching.

2. Description of the Related Art

Conventionally, there are varieties of technologies for detecting matching points among a plurality of images. As these kinds of technologies, the following technologies are famous. For example, a Harris corner detector (C. Harris and M. Stephens, "A combined corner and edge detector", Proceedings of Fourth Alvey Vision Conference, 147-151, 1988) is a technology for detecting a feature point from an image. A SIFT (D. G. Lowe, "Object recognition from local scale-invariant features", Proceedings of IEEE International Conference on Computer Vision (ICCV), 1150-1157, 1999) is a technology for detecting and matching a feature point.

Typically, a matching point is calculated through the following processing flow.

Feature point detection: feature points of two images are detected.

Feature quantity calculation: feature quantities at feature points of two images are calculated.

Matching point calculation: a matching point is detected from the matching degree of feature points between two images.

The number and distribution of matching points which are finally detected are significantly affected by detection sensitivity for feature points in the feature point detection or detection sensitivity in the matching point detection. As the detection sensitivity for feature points is increased, the number of feature points increases. However, the increase of the detection sensitivity raises the possibility that noise points which are not suitable as feature points will be detected as feature points. Furthermore, as the sensitivity of the matching point detection is increased, the number of feature points increases. However, the increase in sensitivity of the matching point detection raises the possibility that mismatch between feature points will occur. The sensitivities may include various sensitivities which are empirically obtained in consideration of parameters such as the desired numbers of feature points and matching points, an allowable ratio of noise points, and calculation time.

In an image composition technology using feature point matching between images or a technology for estimating a camera attitude change between images, it is desirable that matching points should be calculated in order to be uniformly distributed on the entire image. However, when the detection sensitivity for feature points or the detection sensitivity for matching points is constant, an excessively large or small number of matching points may exist in the image region.

As a technology for uniformly distributing matching points, Jpn. Pat. Appln. KOKAI Publication No. 2011-13890 discloses an image composition device and method which performs matching between two images, divides the image into a plurality of regions, and reduces matching points in each of the regions when the number of matching points within the region is large. Furthermore, Jpn. Pat. Appln. KOKAI Publication No. 2012-43403 discloses a feature point extraction method and device which changes detection sensitivity for feature points based on the value of pixel dispersion in a region, and adaptively detects feature points according to the magnitude of contrast in the region.

BRIEF SUMMARY OF THE INVENTION

According to a first aspect of the invention, an image processing apparatus comprises: an image analysis unit configured to acquire a distribution condition of feature points in an entire input image and a distribution condition of feature points in each of a plurality of small regions set in the input image, through image analysis; a target point number setting unit configured to set a target point number for each small region, based on the distribution condition of feature points in the entire input image, the target point number indicating the number of feature points which are to be detected during feature point detection; an expected point number setting unit configured to set an expected point number for each small region, based on the distribution condition of feature points in the small region, the expected point number indicating the number of feature points which are expected to be detected in the small region during feature point detection; a comparison unit configured to compare the target point number and the expected point number for each small region; a sensitivity setting unit configured to set detection sensitivity during feature point detection for each small region, based on the comparison result of the comparison unit; and a feature point detection unit configured to perform feature point detection according to the detection sensitivity set by the sensitivity setting unit.

According to a second aspect of the invention, an image processing apparatus comprises: an image analysis unit configured to acquire a distribution condition of matching points in all of a plurality of input images and a distribution condition of matching points in each of a plurality of small regions set in each of the input images, through image analysis; a target point number setting unit configured to set a target point number for each small region, based on the distribution condition of matching points in all of the input images, the target point number indicating the number of matching points which are to be detected during matching point detection; an expected point number setting unit configured to set an expected point number for each small region, based on the distribution condition of matching points in each small region, the expected point number indicating the number of matching points which are expected to be detected in the small region during matching point detection; a comparison unit configured to compare the target point number and the expected point number for each small region; a sensitivity setting unit configured to set detection sensitivity during matching point detection for each small region, based on the comparison result of the comparison unit; and a matching unit configured to perform matching point detection according to the detection sensitivity set by the sensitivity setting unit.

According to a third aspect of the invention, an image processing apparatus comprises: an image analysis unit configured to acquire a distribution condition of feature points in an entire input image through image analysis; a target point number setting unit configured to set a target point number for each small region, based on the distribution condition of feature points in the entire input image, the target point number indicating the number of feature points which are to be detected during feature point detection; a sensitivity setting unit configured to set detection sensitivity during feature point detection; and a feature point detection unit configured to perform feature point detection according to the detection sensitivity set by the sensitivity setting unit. The sensitivity setting unit increases the detection sensitivity for the small region in which the number of feature points detected by the feature point detection unit is smaller than the target point number, when the feature point detection is performed again, and the sensitivity setting by the sensitivity setting unit and the feature point detection by the feature point detection unit are repeated until the number of feature points detected by the feature point detection unit reaches the target point number.

According to a fourth aspect of the invention, an image processing apparatus comprises: an image analysis unit configured to acquire a distribution condition of matching points in an entire input image through image analysis; a target point number setting unit configured to set a target point number for each small region, based on the distribution condition of matching points in the entire input image, the target point number indicating the number of matching points which are to be detected during matching point detection; a sensitivity setting unit configured to set detection sensitivity during matching point detection; and a matching unit configured to perform matching point detection according to the detection sensitivity set by the sensitivity setting unit. The sensitivity setting unit increases the detection sensitivity for the small region in which the number of matching points detected by the matching unit is smaller than the target point number, when the matching point detection is performed again, and the sensitivity setting by the sensitivity setting unit and the matching point detection by the matching unit are repeated until the number of matching points detected by the matching unit reaches the target point number.

According to a fifth aspect of the invention, an image processing apparatus comprises: an image analysis unit configured to acquire a distribution condition of feature points in each of a plurality of small regions set in an input image, through image analysis; a target point number setting unit configured to set a target point number for each small region, the target point number indicating the number of feature points which are to be detected during feature point detection; an expected point number setting unit configured to set an expected point number for each small region, based on the distribution condition of feature points in the small region, the expected point number indicating the number of feature points which are expected to be detected in the small region during feature point detection; a comparison unit configured to compare the target point number and the expected point number for each small region; a sensitivity setting unit configured to set detection sensitivity during feature point detection for each small region, based on the comparison result of the comparison unit; and a feature point detection unit configured to perform feature point detection according to the detection sensitivity set through the sensitivity setting unit.

According to a sixth aspect of the invention, an image processing apparatus comprises: an image analysis unit configured to acquire a distribution condition of matching points in each of a plurality of small regions set in an input image, through image analysis; a target point number setting unit configured to set a target point number for each small region, the target point number indicating the number of matching points which are to be detected during matching point detection; an expected point number setting unit configured to set an expected point number for each small region, based on the distribution condition of feature points in the small region, the expected point number indicating the number of matching points which are expected to be detected in the small region during matching point detection; a comparison unit configured to compare the target point number and the expected point number for each small region; a sensitivity setting unit configured to set detection sensitivity during matching point detection for each small region, based on the comparison result of the comparison unit; and a matching unit configured to perform matching point detection according to the detection sensitivity set through the sensitivity setting unit.

According to a seventh aspect of the invention, an image processing method comprises: acquiring a distribution condition of feature points in an entire input image and a distribution condition of feature points in each of a plurality of small regions set in the input image, through image analysis; setting a target point number for each small region, based on the distribution condition of feature points in the entire input image, the target point number indicating the number of feature points which are to be detected during feature point detection; setting an expected point number for each small region, based on the distribution condition of feature points in the small region, the expected point number indicating the number of feature points which are expected to be detected in the small region during feature point detection; comparing the target point number and the expected point number for each small region; setting detection sensitivity during feature point detection for each small region, based on the comparison result between the target point number and the expected point number; and performing feature point detection according to the set detection sensitivity.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating the configuration of an image processing apparatus according to a first embedment of the present invention.

FIG. 6 is a block diagram illustrating the configuration of an image processing apparatus according to a second embodiment of the present invention.

FIG. 11 is a flowchart of a matching point candidate detection process.

FIG. 12 is a block diagram illustrating the configuration of an image processing apparatus according to a fourth embodiment of the present invention.

FIG. 13 is a flowchart illustrating the entire processing flow of feature point detection in the image processing apparatus according to the fourth embodiment of the present invention.

FIG. 14 is a flowchart illustrating a feature point detection process according to the fourth embodiment of the present invention.

FIG. 16 is a flowchart showing the entire processing flow of feature point detection in the image processing apparatus according to the fifth embodiment of the present invention.

DETAILED DESCRIPTION OF THE INVENTION

Figure 2:
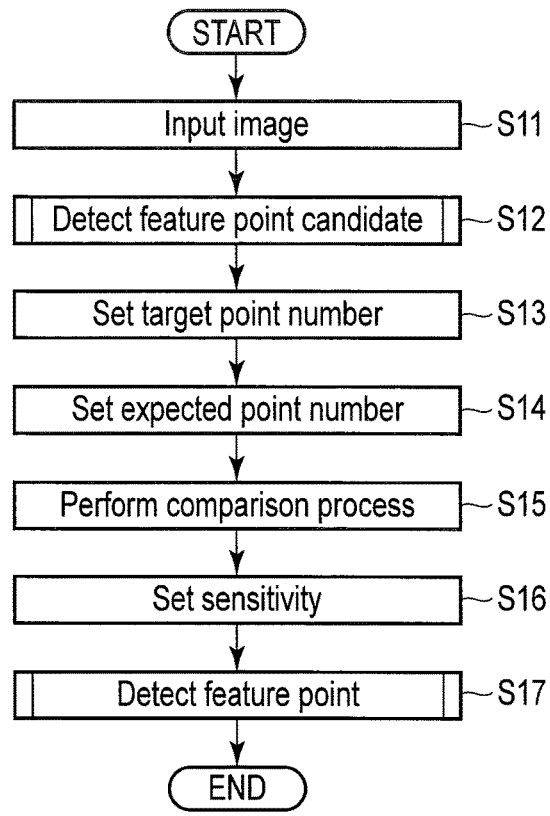
FIG. 2 is a flowchart illustrating the entire processing flow of feature point detection in the image processing apparatus according to the first embedment of the present invention.

Hereafter, embodiments of the present invention will be described with reference to the accompanying drawings.

First Embodiment

First, a first embodiment of the present invention will be described. In the present embodiment, when feature points are detected from one image, image analysis is performed on the entire image and each of a plurality of small regions obtained by dividing the entire image, detection sensitivity is set for each small region based on the image analysis results for the entire image and each small region, and the feature points are detected according to the detection sensitivity set for each small region. Furthermore, feature point detection based on a predetermined parameter is used as the image analysis method.

Furthermore, image processing apparatuses according to the following embodiments of the present invention are not limited to a predetermined device. For example, the image processing apparatuses according to the respective embodiments of the present invention may be mounted on various devices such as a personal computer and a digital camera. Furthermore, the same functions as those of the image processing apparatuses according to the respective embodiments of the present invention may be realized through cloud computing.

FIG. 1 is a block diagram illustrating the configuration of an image processing apparatus according to a first embodiment of the present invention. The image processing apparatus illustrated in FIG. 1 includes a controller 102, a memory unit 104, an image processing unit 106, and an image input unit 108.

The controller 102 inputs various control signals to the image processing unit 106, in order to control the operation of the image processing unit 106. For example, the controller 102 controls the image processing unit 106 to perform feature point detection or matching point detection.

The memory unit 104 includes a memory medium such as a hard disk drive (HDD) or dynamic RAM (DRAM). The HDD stores image data inputted by the image input unit 108, initial parameters used for feature point candidate detection which will be described below, and various programs executed by the controller 102. The DRAM is used as a working memory which temporarily stores processing data for the controller 102 and the image processing unit 106.

The image processing unit 106 performs image processing on image data inputted from the image input unit 108. The image processing unit 106 according to the present embodiment performs image processing to detect feature points in the image data.

The image input unit 108 reads image data deployed in the DRAM from HDD of the memory unit 104, and inputs the read data to the image processing unit 106.

The image processing unit 106 includes an image analysis section 1061, a detection sensitivity setting section 1062, and a feature point detection section 1063.

The image analysis section 1061 analyzes the image data inputted from the image input unit 108, and acquires a distribution condition of feature points in the input image data. The image analysis section 1061 includes a feature point candidate detection portion 1061a. The feature point candidate detection portion 1061a analyzes the image data based on each pixel value of the image data inputted from the image input unit 108, and acquires the distribution condition of the feature points by detecting points (pixels) which become feature point candidates in the image data. In the present embodiment, the feature point candidate detection portion 1061a detects feature point candidates in the entire image data and feature point candidates for each small region within the image data.

The detection sensitivity setting section 1062 sets the detection sensitivity for feature points in each small region of the image data, based on the analysis result of the image data by the image analysis section 1061. The detection sensitivity setting section 1062 has a target point number setting portion 1062a, an expected point number setting portion 1062b, a comparison portion 1062c, and a sensitivity setting portion 1062d.

The target point number setting portion 1062a sets a target point number for each small region, based on the total number of feature point candidates in the image data. The target point number indicates the number of feature points which are to be finally detected. The expected point number setting portion 1062b sets an expected point number for each small region. The expected point number indicates the number of feature points which are expected to be detected. The comparison portion 1062c compares the expected point number for each small region to the target point number. The sensitivity setting portion 1062d sets the detection sensitivity for feature points in each small region, based on the comparison result between the expected point number and the target point number.

The feature point detection section 1063 detects feature points in the image data according to the detection sensitivity set by the sensitivity setting portion 1062d.

FIG. 2 is a flowchart illustrating the entire processing flow of feature point detection as an image processing method using the image processing apparatus according to the first embodiment of the present invention.

The image input unit 108 reads image data stored in the memory unit 104, and inputs the read data to a feature point candidate detection portion 1061a of the image analysis section 1061 (S11). Hereafter, the image data inputted to the image analysis section 1061 will be referred to as an input image.

After the image input process, the feature point candidate detection portion 1061a analyzes the input image by detecting feature point candidates in the input image (S12). The input image analysis is performed in order to estimate how many feature points can be detected from the input image. In the present embodiment, the estimation is performed by detecting points (feature point candidates) which become candidates of feature points. More specifically, in the feature point candidate detection process according to the present embodiment, the feature point candidate detection portion 1061a detects feature point candidates of the entire input image and feature point candidates of each small region set in the input image. Hereafter, the feature point candidate detection process will be described with reference to FIG. 3.

Figure 3:
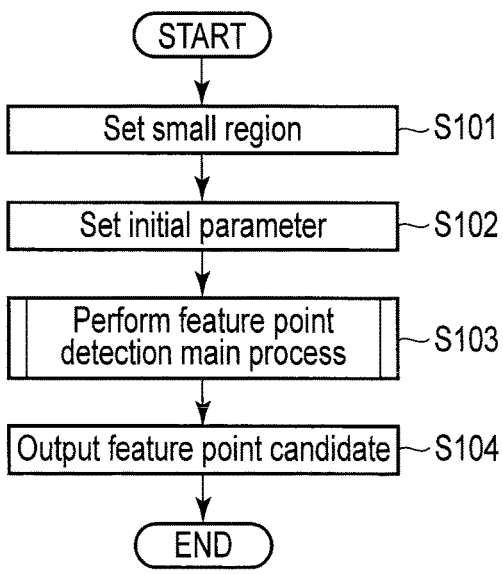
FIG. 3 is a flowchart of a feature point candidate detection process according to the first embedment of the present invention.

In FIG. 3, the feature point candidate detection portion 1061a sets a plurality of small regions in the input image (S101). At the small region setting process, the feature point candidate detection portion 1061a sets the plurality of small regions such that the input image is equally divided into 8×8 blocks, for example. The small regions are defined by the positions and ranges of the 64 (8×8) small regions on the input image.

Subsequently, the feature point candidate detection portion 1061a calls initial parameters for feature point candidate detection from the memory unit 104, and set the initial parameters (S102). The initial parameters include an initial scale parameter par_scale0 used for evaluation value calculation, an initial evaluation threshold value par_v0 used for threshold determination, and an initial maximal property evaluation range par_maximum0 used for maximal property evaluation. The details of these initial parameters will be described below when a subsequent feature point detection main process is described.

After the initial parameter setting, the feature point candidate detection portion 1061a performs the feature point detection main process (S103). In the feature point detection main process, the feature point candidate detection portion 1061a detects overall feature point candidates of the input image and feature point candidates of each small region, using the initial parameters. Hereafter, the feature point detection main process will be described with reference to FIG. 4.

Figure 4:
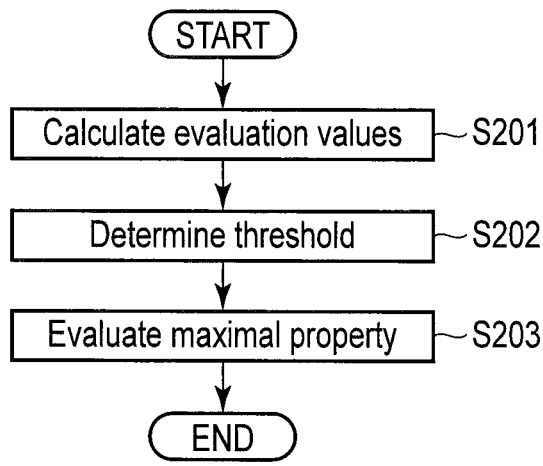
FIG. 4 is a flowchart of a feature point detection main process according to the first embedment of the present invention.

In the feature point detection main process illustrated in FIG. 4, the feature point candidate detection portion 1061a calculates an evaluation value for each coordinate (pixel) of the input image, and generates an evaluation value map having the same resolution as the input image (S201). The evaluation value indicates the likelihood of a feature point in the input image, as an index. The likelihood of a feature point indicates the extent of change in image structure of an image region with a certain coordinate set to the center thereof. Thus, a flat region of the image has a low evaluation value, and an edge region of the image has a high evaluation value. A specific calculation method for the evaluation value is not limited. For example, an evaluation value R of a Harris corner detector at a certain coordinate may be calculated through the following equation.

$$M = \begin{bmatrix} \left(\frac{\partial I}{\partial x}\right)^2 & \frac{\partial I}{\partial x}\frac{\partial I}{\partial y} \\ \frac{\partial I}{\partial x}\frac{\partial I}{\partial y} & \left(\frac{\partial I}{\partial y}\right)^2 \end{bmatrix}$$

$$R = \det M - k(trM)^2$$

Here, a general feature point detection algorithm sets at which scale the evaluation value is calculated, as a parameter. The initial parameter at this time is the initial scale parameter par_scale0. The scale is a concept based on a combination of the range of an image region around a coordinate of interest and a smoothing parameter of a smoothing process.

After the evaluation value calculation, the feature point candidate detection portion 1061a performs threshold determination (S202). In the threshold determination process, the feature point candidate detection portion 1061a compares each evaluation value of the evaluation value map to a predetermined threshold value, and stores the coordinate and evaluation value of a point at which the evaluation value is equal to or more than the threshold value. The predetermined threshold value is the initial evaluation threshold value par_v0.

After the threshold determination, the feature point candidate detection portion 1061a performs maximal property evaluation (S203). In the maximal property evaluation process, the feature point candidate detection portion 1061a compares the evaluation value of a coordinate, which has an evaluation value equal to or more than the initial evaluation threshold value par_v0, to the evaluation values of surrounding coordinates, and determines whether the coordinate has the largest evaluation value. For example, when an image region having nine pixels (3×3 pixels) is considered as an evaluation range, the feature point candidate detection portion 1061a compares the evaluation value of a coordinate of interest to the evaluation values of eight coordinates around the coordinate of interest. When the pixel of interest has the largest evaluation value, the coordinate is set to a feature point candidate. The evaluation range is the initial maximal property evaluation range par_maximum0.

Then, return to the description of FIG. 3. After the feature point detection main process is completed, the feature point candidate detection portion 1061a outputs the coordinate value of the feature point candidate (S104). In the output process, the feature point candidate detection portion 1061a outputs the coordinate values of the feature points in the entire input image to the target point number setting portion 1062a. Furthermore, the feature point candidate detection portion 1061a outputs the coordinate values of the feature points in each small region of the input image to the expected point number setting portion 1062b.

Then, return to the description of FIG. 2. After the feature point candidate detection process, the target point number setting portion 1062a sets a target point number, based on the result of the feature point candidate detection for the entire input image (S13). The target point number indicates how many feature points are to be finally detected in each small region. In the target point number setting process, the target point number setting portion 1062a sets a value obtained by dividing the number of feature point candidates of the entire input image by the number of small regions, to the target point number. That is, the target point number is set according to the following equation.

numOneArea=numP/64 numOneArea: Target point for each small region
numP: Number of feature point candidates of entire input image The expected point number setting portion 1062*b* sets an expected point number based on the result of the feature point candidate detection for each small region, when the feature point detection is performed based on the initial parameters (S14). The expected point number indicates how many feature points can be detected. In the expected point number setting process, the expected point number setting portion 1062*b* uses the number of feature point candidates for each small region, detected in the feature point candidate detection process, as the expected point number. When the number of small regions is 64 (8×8), 64 expected point numbers are set.

When the target point number and the expected point numbers are set, the comparison portion 1062*c* compares the expected point number set for each small region to the target point number (S15). In the comparison process, the comparison portion 1062*c* determines a difference between the target point number and the expected point number. When the expected point number is smaller than the target point number, the comparison portion 1062*c* determines that the detection sensitivity for feature points needs to be increased to a higher value than the initial parameter, and sets a re-detection flag to ON. On the other hand, when the expected point number is equal to or larger than the target point number, the comparison portion 1062*c* sets the re-detection flag to OFF.

After the comparison process of the comparison portion 1062*c*, the sensitivity setting portion 1062*d* sets the detection sensitivity for feature points in each small region, based on the comparison result between the target point number and the expected point number for each small region (S16). In the detection sensitivity setting process, the sensitivity setting portion 1062*d* sets parameters for feature point detection in each small region according to the state of the re-detection flag. When the re-detection flag is set to OFF, it indicates that the expected point number is equal to or more than the target point number. Thus, the feature point candidates are reduced. The feature point candidate reduction process is performed during the subsequent feature point detection process. Furthermore, when the re-detection flag is set to OFF, the above-described initial parameter is used as the detection sensitivity. On the other hand, when the re-detection flag is set to ON, the expected point number is less than the target point number. In this case, the sensitivity setting portion 1062*d* sets the parameter during the feature point detection such that the feature points are easily detected. Specifically, the sensitivity setting portion 1062*d* sets the parameters as follows.

(1) The scale parameter par_scale_n is set to a smaller value than the initial scale parameter par_scale0.
par_scale_n<par_scale0
(2) The evaluation threshold value par_v_n is set to a smaller value than the initial evaluation threshold value par_v0.
par_v_n<par_v0
(3) The maximal property evaluation range par_maximum_n is set to a smaller value than the initial maximal property evaluation range par_maximum0.
par_maximum_n<par_maximum0

As a modification of the sensitivity setting process, a difference between the expected point number and the target point number in the comparison process may be calculated, and the extent to which the parameter is changed in the sensitivity setting process may be changed according to the difference. Specifically, when the scale parameter par_scale_n, the evaluation threshold value par_v_n, and the maximal property evaluation range par_maximum_n are decreased, the feature points are detected more easily. Thus, the larger the difference become, the smaller the parameters are set.

After the detection sensitivity is set for each small region, the feature point detection section 1063 detects feature points in the input image, based on the set detection sensitivity for feature points (S17). Then, the process of FIG. 2 is ended. Hereafter, the feature point detection process will be described with reference to FIG. 5. The feature point detection process illustrated in FIG. 5 is repeated by the number of small regions.

Figure 5:
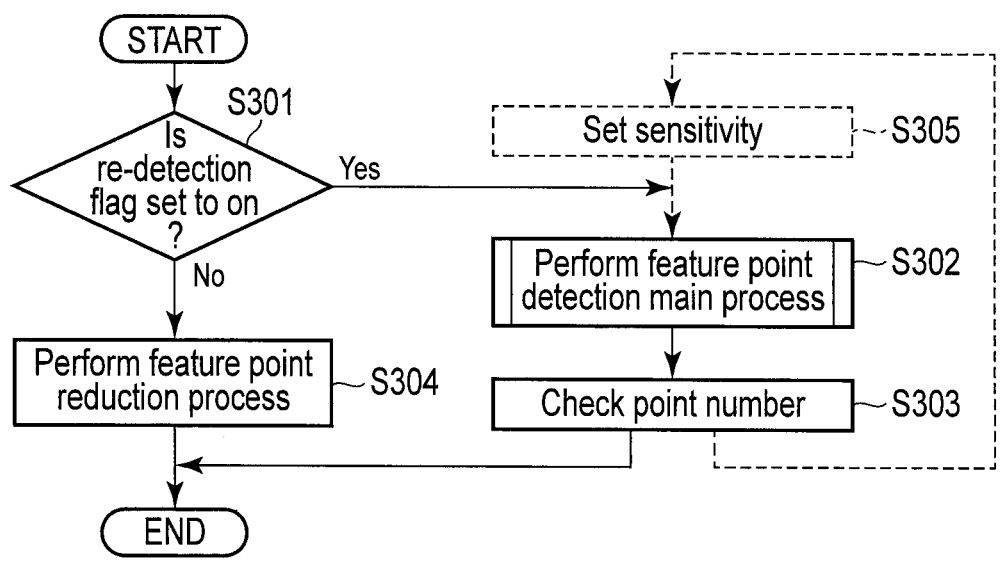
FIG. 5 is a flowchart of feature point candidate detection process according to the first embodiment of the present invention.

In FIG. 5, the feature point detection section 1063 determines whether the re-detection flag is set to ON (S301). When it is determined in step S301 that the re-detection flag is set to ON, the feature point detection section 1063 performs the feature point detection main process (S302). When the expected point number of a small region is less than the target point number, the feature point detection main process is performed again. A specific processing flow is performed in the same manner as the processing flow shown in FIG. 4. However, in the feature point detection main process in the feature point candidate detection, the initial parameters are used. In the feature point detection main process of step S302, the parameters set through the sensitivity setting process are used to detect feature points. Thus, in the feature point detection main process of step S302, a larger number of feature points are highly likely to be detected than in the feature point detection main process of the feature point candidate detection.

After the feature point detection main process, the feature point detection section 1063 compares the number of feature points detected through the feature point detection main process to the target point number, and checks whether the number of feature points reaches the target point number (S303). Then, the feature point detection process for the corresponding small region is ended. When the number of feature points does not reach the target point number, the sensitivity setting portion 1062*d* may reset the parameters for feature point detection to detect a larger number of points, as long as the calculation cost is allowed, and perform the feature point detection again (S305). Until the number of feature points reaches the target point number, the parameter setting for feature point detection by the sensitivity setting portion 1062*d* and the feature point detection process by the feature point detection section 1063 may be repeated. Furthermore, when the calculation cost is not allowed, a message indicating that the number of feature points detected in the corresponding small region does not reach the target point number may be outputted to the controller 102, for example.

When it is determined in step S301 that the re-detection flag is set to OFF, the feature point detection section 1063 performs a feature point reduction process (S304). Then, the feature point detection process for the corresponding small region is ended. In the feature point reduction process, the feature point detection section 1063 decreases the number of feature point candidates such that the number of feature point candidates corresponds to the target point number. For example, the feature point detection section 1063 sorts the feature point candidates according to the evaluation values which are calculated in the feature point detection main process, selects feature point candidates corresponding to the target point number in a descending order of the evaluation values, and sets the selected feature point candidates to the final feature points.

The sensitivity setting and the feature point detection may be modified in various manners. In the above-described example, three parameters are changed during the sensitivity setting. In reality, however, the parameters may be changed as follows, in consideration of the calculation cost.

When the expected point number is less than the target point number but a difference therebetween is not so large according to the comparison result between the target point number and the expected point number in the comparison process, only the evaluation threshold value par_v_n may be set to a small value, and the number of feature points having an evaluation value equal to or larger than the evaluation threshold value parvn may be calculated. Then, based on the number of feature points, the scale parameter par_scale_n for evaluation value calculation may be changed to determine whether the evaluation value calculation needs to be performed again. In general, the evaluation value calculation is known to require a high calculation cost. As the necessity of the recalculation for the evaluation value is determined before the recalculation is performed, it is possible to prevent an unnecessary recalculated for the evaluation value.

In the present embodiment, it has been described that the distribution condition of feature points in the input image is acquired for the entire input image and each small region through the image analysis, and the feature point detection is performed based on the target point number set according to the analysis result for the entire input image and the expected point number set according to the analysis result for each small region. Thus, the feature point detection may be performed in such a manner that the feature points are uniformly distributed on the image plane of the input image. That is, in a small region of which the expected point number is less than the target point number, the parameters for feature point detection may be set in such a manner that feature points are easily detected in the small region. Then, the number of feature points detected in the small region may be approximated to the target point number. Furthermore, in a small region where a large number of feature points are detected, the number of feature points may be reduced to approximate the number of feature points detected in the small region to the target point number. In this way, the number of feature points detected in each small region may be approximated to the target point number, and the distribution of the feature points may be uniformized.

In the above-described example, each small region is set in such a manner that the input image is equally divided into 8×8 blocks. However, the number or shape of small regions is not limited thereto. For example, the number of small regions may be changed by varying the number of divisions. Furthermore, when the extent to which feature points are desired to be uniformly detected is different depending on the position of an input image, the input image may be unequally divided into small regions. In this case, the target point number or expected point number may be weighted according to the area of the small region.

Furthermore, in FIG. 2, it has been described that the process of step S13 and the process of step S14 are sequentially performed. However, the process of step S13 and the process of step S14 may be performed in reverse order or performed in parallel.

Second Embodiment

Next, a second embodiment of the present invention will be described. In the first embodiment, the feature point candidate detection is used for the input image analysis. When the feature point candidate detection is used, the distribution of feature points is effectively uniformized. However, the feature point detection main process needs to be performed in each of the feature point candidate process and the feature point detection process. In the second embodiment, simpler image analysis is performed than in the first embodiment, thereby reducing a calculation cost in comparison to the first embodiment.

FIG. 6 is a block diagram illustrating the configuration of an image processing apparatus according to a second embedment of the present invention. In FIG. 6, components corresponding to the components of FIG. 1 are represented by the same reference numerals as those of FIG. 1, and the descriptions thereof are omitted. The image processing apparatus illustrated in FIG. 6 is different from the image processing apparatus of FIG. 1 in that an image analysis section 1061 includes a pixel dispersion calculation portion 1061*b*.

The pixel dispersion calculation portion 1061*b* calculates dispersion of pixels values of an input image from an image input unit 108, and acquires a distribution condition of feature points.

Figure 7:
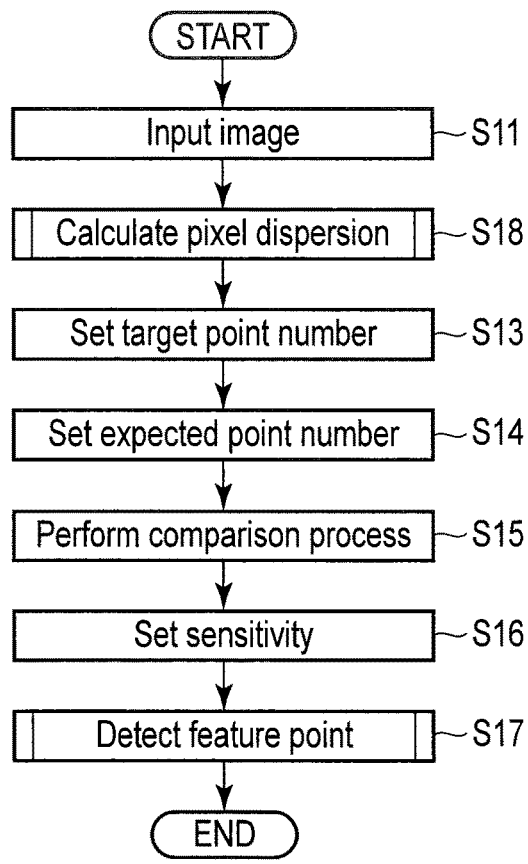
FIG. 7 is a flowchart illustrating the entire processing flow of feature point detection in the image processing device according to the second embodiment of the present invention.

FIG. 7 is a flowchart illustrating the entire processing flow of feature point detection in the image processing device according to the second embedment of the present invention. In the flowchart shown in FIG. 7, the feature point candidate detection in step S12 of FIG. 2 is substituted with pixel dispersion calculation in step S18. Thus, the descriptions of processes in steps S11, S15, S16, and S17, which are performed in the same manner as those of FIG. 2, are omitted herein.

Figure 8:
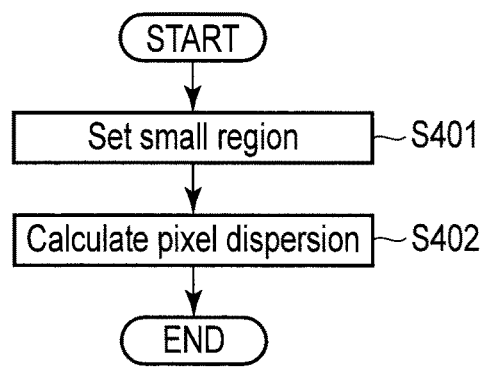
FIG. 8 is a flowchart of pixel dispersion calculation.

FIG. 8 is a flowchart of the pixel dispersion calculation. As described above, the image analysis is performed to estimate how many feature points are to be detected, before the feature point detection is performed. In an image region of which the structure is significantly changed, a larger number of feature points tend to be detected. The image region of which the structure is significantly changed refers to an image region of which the pixel values are significantly changed. In the pixel dispersion calculation, image dispersion is calculated to indicate the change of the image structure as an index.

In FIG. 8, the pixel dispersion calculation portion 1061*b* sets a plurality of small regions for the input image (S401). The small region setting is performed in the same manner as described with reference to FIG. 3. Thus, the detailed descriptions thereof are omitted herein.

After the small region setting, the pixel dispersion calculation portion 1061*b* calculates pixel dispersion of the entire input image and pixel dispersion of each small region (S402). In the pixel dispersion calculation process, the pixel dispersion calculation portion 1061*b* calculates the pixel dispersion through the following equation.

$$s = \frac{1}{n}\sum (I(x, y) - I_{mean})^2$$

s: Dispersion value
I(x, y): Pixel value of coordinate (x, y) in image range I
$I_{mean}$: Average pixel value in image range I
n: Pixel number in image range I In the above-described equation, an image range I corresponds to the range of the entire input image when the image dispersion of the entire input image is calculated, and corresponds to the range of each small region when the pixel dispersion of the small region is calculated.

In the present embodiment, the change of the image structure is indicated as an index through the pixel dispersion. However, the pixel dispersion does not need to be used to indicate the change of the image structure as an index, but various calculation methods may be used. For example, a textural analysis method may be used, which analyzes textural features obtained by calculating contrast, concentration histogram of an input image, or a co-occurrence matrix.

After the pixel dispersion calculation process, a target point number setting portion 1062a sets a target point number, based on the result of the pixel dispersion calculation for the entire input image (S13). The target point number indicates how many feature points are to be finally detected for each small region. In the target point number setting process, the target point number setting portion 1062a calculates an expected number of feature points which can be detected in the entire input image from the dispersion value of the entire input image, according to the same method as step S14 in the above-described embodiment, and sets a value obtained by dividing the expected point number by the number of small regions to a target point number.

Furthermore, an expected point number setting portion 1062b sets an expected point number based on the result of the pixel dispersion calculation for each small region (S14). The expected point number indicates how many feature points can be detected. In the expected point number setting process, the expected point number setting portion 1062b compares the pixel dispersion value for each small region to a previously created correspondence table between pixel dispersion values and expected point numbers, and acquires a corresponding expected point number. The correspondence table may be obtained by performing a process of calculating the number of feature points by actually performing feature point detection on an image region having a pixel dispersion value, with respect to various pixel dispersions and various image regions.

Processes after S15 may be performed in the same manner as those of FIGS. 2, 4, and 5. Thus, the detailed descriptions thereof are omitted herein.

In the second embodiment, the number of feature points for the entire input image and the number of feature points for each small region are calculated from the pixel dispersion value acquired from the result of the pixel dispersion calculation process, and the target point number and the expected point number are set based on the numbers of feature points, as in the first embodiment. On the other hand, the target point number and the expected point number may be set without calculating the number of feature points. For example, the pixel dispersion for each small region may be set to the expected point number, and the pixel dispersion for the entire input image may be set to the target point number. In other words, the detection sensitivity for each small region may be set according to the magnitude relation between the pixel distribution for each small region and the pixel distribution of the entire input image, without using a previously created correspondence table between pixel dispersions and expected point numbers and a previously created correspondence table between pixel dispersions and target point numbers.

According to the present embodiment, the distribution condition of feature points in the input image may be analyzed by simple image analysis before the feature point detection is performed, and the detection sensitivity for each small region may be set. Thus, while the calculation load is reduced, the feature points may be detected in such a manner that the distribution of the feature points is uniformized in the entire input image.

Third Embodiment

Next, a third embodiment of the present invention will be described. In the first and second embodiments, the sensitivity setting is performed when feature points are detected from one image. In the third embodiment, however, sensitivity setting for matching is performed when feature points are matched between two images.

Figure 9:
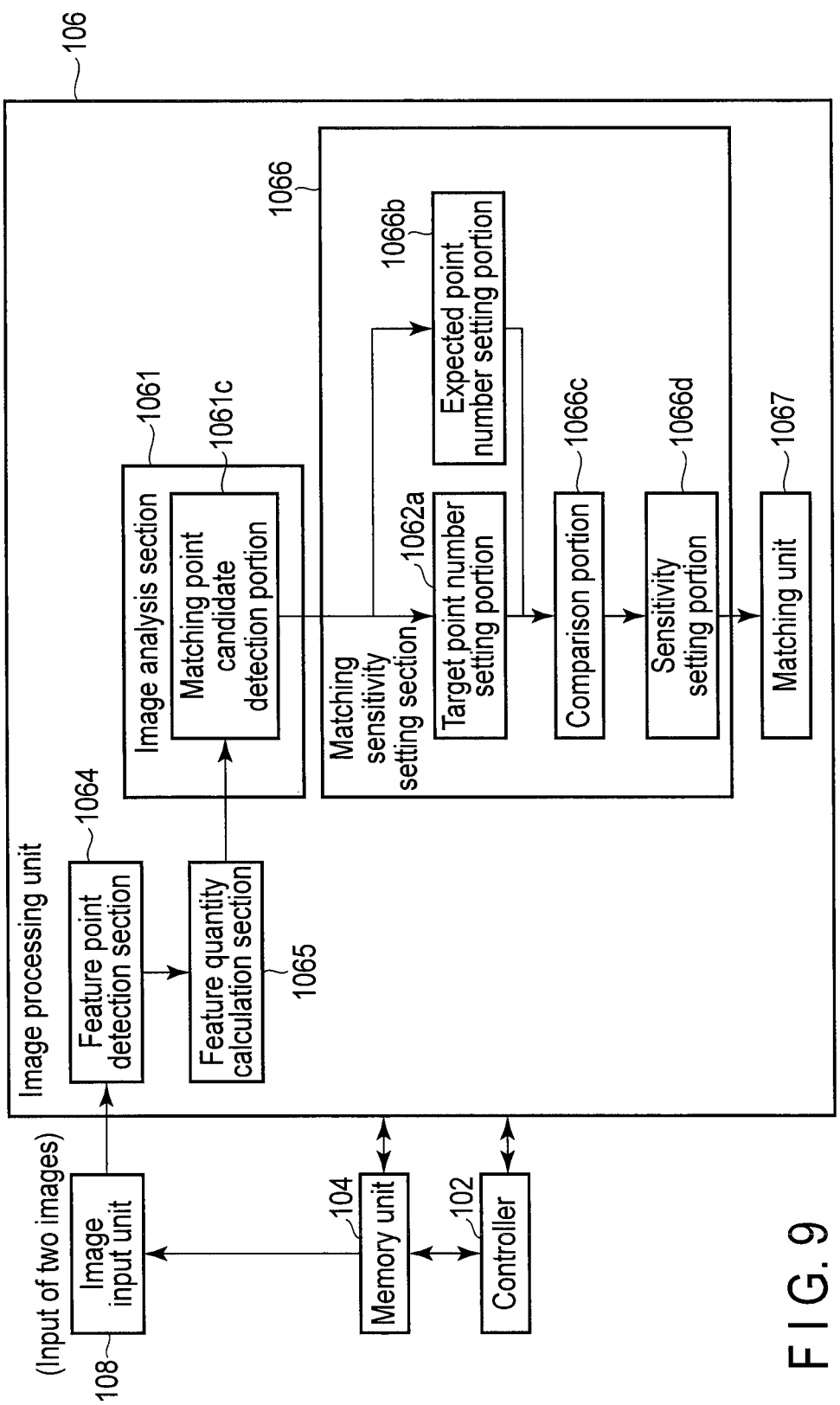
FIG. 9 is a block diagram illustrating the configuration of an image processing apparatus according to a third embodiment of the present invention.

FIG. 9 is a block diagram illustrating the configuration of an image processing apparatus according to a third embodiment of the present invention. In FIG. 9, components corresponding to the components of FIG. 1 are represented by the same reference numerals as those of FIG. 1, and the detailed descriptions thereof are omitted. The image processing apparatus illustrated in FIG. 9 is different from the image processing apparatus of FIG. 1 in that an image processing unit 106 includes a feature point detection section 1064, a feature quantity calculation section 1065, a matching sensitivity setting section 1066, and a matching section 1067, and an image analysis section 1061 includes a matching point candidate detection portion 1061c. Furthermore, in the third embodiment, an image input unit 108 inputs two images to the image processing unit 106, unlike the first and second embodiments.

The feature point detection section 1064 detects feature points of the two images inputted from the image input unit 108. The method for detecting feature points is not specifically limited. For example, the methods described in the first and second embodiments may be applied, and a simpler method may be applied.

The feature quantity calculation section 1065 calculates the feature quantities of the feature points of the two input images, detected through the feature point detection section 1064.

The matching point candidate detection portion 1061c of the image analysis section 1061 detects points, which become the candidates of matching points in the two input images, as matching point candidates, based on the feature quantities calculated through the feature quantity calculation section 1065.

The matching sensitivity setting section 1066 sets the matching detection sensitivity for each small region of the image data, based on the analysis result of the image data by the image analysis section 1061. The matching sensitivity setting section 1066 includes a target point number setting portion 1066a, an expected point number setting portion 1066b, a comparison portion 1066c, and a sensitivity setting portion 1066d. The target point number setting portion 1066a, the expected point number setting portion 1066b, the comparison portion 1066c, and the sensitivity setting portion 1066d correspond to the blocks illustrated in FIG. 1. However, there is a difference in that these blocks perform processing on the two input images. The details thereof will be described below.

The matching section 1067 detects matching points in the two input images according to the detection sensitivity set by the sensitivity setting portion 1066d.

Figure 10:
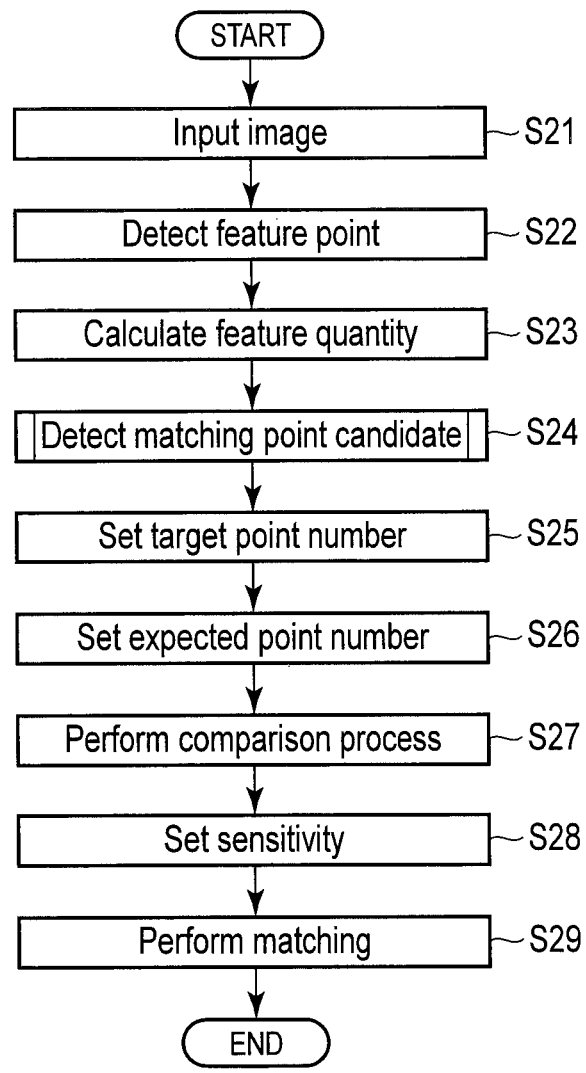
FIG. 10 is a flowchart illustrating the entire processing flow of matching point detection in the image processing device according to the third embodiment of the present invention.

FIG. 10 is a flowchart illustrating the entire processing flow of the matching point detection in the image processing device according to the third embedment of the present invention.

The image input unit 108 reads two image data stored in a memory unit 104, and inputs the read data to the feature point detection section 1064 (S21). Hereafter, the two image data inputted to the feature point detection section 1064 will be referred to as an input image IA and an input image IB, respectively.

After the input process, the feature point detection section 1064 detects feature points of the input images IA and IB (S22). In the feature point detection process, an arbitrary method can be used as the method for detecting feature points.

After the feature point detection process, the feature quantity calculation section 1065 calculates the feature quantities of the feature points of the input images IA and IB, detected through the feature point detection section 1064 (S23). In the feature quantity calculation process, the feature quantity calculation method is not limited. For example, a SIFT descriptor calculates a 128-dimensional feature quantity. The calculation is performed by the number numP of feature points, in order to obtain numP feature quantity vectors v.

$v=(v_1, \ldots, v_{128})$
$v=(v_1, \ldots, v_{128})$

After the feature quantity calculation, the matching point candidate detection portion 1061c analyzes the two input images by detecting matching point candidates (S24). Hereafter, the matching point candidate detection process will be described in detail with reference to FIG. 11.

In FIG. 11, the matching point candidate detection portion 1061c sets a plurality of small regions for each of the two input images IA and IB (S501). The small region setting process is performed in substantially the same manner as the small region setting process of the feature point candidate detection process. In step S501, however, the same small regions are set in both of the input images IA and IB, unlike the small region setting process of the feature point candidate detection process.

Subsequently, the matching point candidate detection portion 1061c calls initial parameters for matching point candidate detection from the memory unit 104, and sets the initial parameters (S502). The initial parameters set herein include an initial matching threshold value par_match_thr0 and an initial matching ratio par_match_ratio0. The details of the initial parameters will be described below when the subsequent matching main process is described.

After the initial parameter setting, the matching point candidate detection portion 1061c performs the matching main process (S503). Hereafter, the matching main process will be described in detail.

Through the process from the image input to the feature quantity calculation, the coordinates and feature quantities of the feature points on the input images IA and IB may be obtained. In the matching main process, the matching point candidate detection portion 1061c compares Euclidean distances d between the feature quantities of the feature points on the input images IA and IB, and a feature point of the input image IB, which has the shortest Euclidean distance with respect to a feature point of the input image IA, is set to a matching point. The Euclidean distance d is calculated through the following equation.

$$d(v^{I_A m}, v^{I_B n}) = \sqrt{\sum_{i=1}^{128} \left(v_i^{I_A m} - v_i^{I_B n}\right)^2}$$

$v^{I_A m}$: Feature quantity vector of m-th feature point of image IA
$v^{I_B n}$: Feature quantity vector of n-th feature point of image IB In order to avoid mismatching, the following process may be performed. Although there is a point having the shortest Euclidean distance, the point may not be set to a matching point when the Euclidean distance is equal to or more than a predetermined threshold value. The threshold value is the initial matching threshold value par_match_thr0. In this process, the matching point candidate detection portion 1061c compares the Euclidean distance d of the feature point having the shortest Euclidean distance to the initial matching threshold value par_match_thr0. Furthermore, when d<par_match_thr0, it is determined whether the feature point having the shortest Euclidean distance is a matching point. Furthermore, when d≥par_match_thr0, it is determined that the feature point having the shortest Euclidean distance is not a matching point.

The method for setting the feature point having the shortest Euclidean distance to a matching point is simple. However, when a large number of similar structures are included in the input images, mismatching easily occurs. Thus, a method for setting a matching point by determining a distance ratio of a point having the shortest Euclidean distance to a point having the next shortest Euclidean distance through a certain threshold value may be performed. The threshold value is the initial matching ratio par_match_ratio0. When a Euclidean distance to a feature point having the shortest Euclidean distance with respect to a feature point of the input image IA is represented by d1 and a Euclidean distance to a feature point having the next shortest Euclidean distance is represented by d2, the distance ratio (ratio) is expressed as the following equation.

$ratio = d_1/d_2$

After the distance ratio (ratio) is calculated, the matching point candidate detection portion 1061c compares the calculated distance ratio (ratio) to the initial matching ratio par_match_ratio0. Furthermore, when ratio<par_match_ratio0, it is determined that the feature point having the shortest Euclidean distance is a matching point. Furthermore, when ratio≥par_match_ratio0, it is determined that the feature point having the shortest Euclidean distance is not a matching point.

The above-described matching main process is performed on the entire input images IA and IB and each small region, and sets the matching point determined as the result of the matching main process to a matching point candidate. After the matching main process is completed, the matching point candidate detection portion 1061c outputs the coordinate value of the matching point candidate.

In the output process, the matching point candidate detection portion 1061c outputs the coordinate values of matching point candidates in the entire input image to the target point number setting portion 1062a. Furthermore, the matching point candidate detection portion 1061c outputs the coordinate values of matching point candidates in each small region of the input image to the expected point number setting portion 1062b.

Here, return to the description of FIG. 10. After the matching point candidate detection, the target point number setting portion 1066a sets a target point number based on the result of the matching point candidate detection for the entire input image (S25). The target point number indicates how many matching points are to be finally detected for each small region. The method for setting the target point number is performed in the same manner as the first embodiment. Thus, the detailed descriptions thereof are omitted herein.

The expected point number setting portion 1066*b* sets an expected point number based on the result of the matching point candidate detection for each small region, when the matching point detection is performed according to the initial parameters (S26). The expected point number indicates how many matching points can be detected. The method for setting the expected point number is performed in the same manner as the first embodiment. Thus, the detailed descriptions thereof are omitted herein.

When the target point number and the expected point number are set, the comparison portion 1062*c* compares the target point number to the expected point number (S27). The comparison process is performed in the same manner as the first embodiment.

After the comparison process by the comparison portion 1066*c*, the sensitivity setting portion 1066*d* sets the detection sensitivity for matching points in each small region, based on the comparison result between the target point number and the expected point number for each small region (S28). The detection sensitivity setting process is also performed in substantially the same manner as the first embodiment. However, the detection sensitivity to be set is the detection sensitivity related to the matching main process, unlike the first embodiment. Specifically, the sensitivity setting portion 1066*d* sets the parameters as follows:

(1) A matching threshold value par_match_thr_n is set to a smaller value than the initial matching threshold value par_match_thr0.

par_match_thr_n<par_match_thr_0

(2) A matching ratio par_match_ratio_n is set to a larger value than the initial matching ratio par_match_ratio0.

par_match_ratio_n>par_match_ratio0

After the detection sensitivity setting, the matching section 1067 detects matching points on the input images IA and IB, based on the set detection sensitivity for matching points (S29). Then, the process of FIG. 10 is ended. The matching point detection process is performed in substantially the same manner as the feature point detection process of FIG. 5, described in the first embodiment. However, the feature point detection main process in step S302 of FIG. 5 may be substituted with the matching main process in step S503. Similarly, in step S304, matching points may be reduced without reducing feature points.

According to the present embodiment, the detection sensitivity for each small region is set according to the distribution of the entire image, in relation to matching points. Then, the matching point detection may be performed as uniformly as possible in the entire image.

In the present embodiment, it has been described that the same small regions are set in the input images IA and IB. However, different small regions may be set in the input images IA and IB. Furthermore, when a uniform matching point distribution is desired in either the input image IA or IB only, the processes after the matching point candidate detection (S24) may be performed only on the desired input image.

In the present embodiment, it has been described that the matching points of the two input images are detected. However, even when matching points of three or more input images are detected, the method of the present embodiment may be applied.

Fourth Embodiment

Next, a fourth embodiment of the present invention will be described. In the first embodiment, when feature points are detected from one image, image analysis is performed on the entire image and each small region, detection sensitivity is set for each small region based on the result of the image analysis for the entire image and each small region, and feature points are detected according to the detection sensitivity set for each small region. Furthermore, the target point number and the expected point number of feature points are set for each small region, based on the result of the image analysis, and the detection sensitivity for feature points is set according to the comparison result between the target point number and the expected point number. In the fourth embodiment, however, the detection sensitivity for feature points is set only from the target point number, without acquiring the expected point number for each small region.

FIG. 12 is a block diagram illustrating the configuration of an image processing apparatus according to a fourth embedment of the present invention. In FIG. 12, components corresponding to the components of FIG. 1 are represented by the same reference numerals as those of FIG. 1, and the descriptions thereof are omitted. The image processing apparatus of FIG. 12 has the same configuration as the image processing apparatus of FIG. 1, except that the image processing apparatus of FIG. 12 does not include an expected point number setting portion 1062*b* and a comparison portion 1062*c*.

FIG. 13 is a flowchart illustrating the entire processing flow of feature point detection in the image processing apparatus according to the fourth embedment of the present invention. Hereafter, the descriptions of the same processes as the first embodiment are omitted. That is, the descriptions of steps S11 and S13 are omitted. Furthermore, in the feature point candidate detection process in step S12, feature point candidates of each small region are not detected, but only feature point candidates of the entire input image are detected, unlike the processing flow of FIG. 2. Thus, the detailed descriptions of step S12 are omitted herein.

After the target point number setting, a sensitivity setting portion 1062*d* and a feature point detection section 1063 perform a feature point detection process (S17). Since an expected point number is not set for each small region unlike the first embodiment, it is difficult to determine the detection sensitivity (corresponding to a parameter used in the feature point detection) at a time. Thus, while the feature point detection process is performed, the parameters are properly changed. Hereafter, the feature point detection process will be described in detail with reference to FIG. 14. The feature point detection process illustrated in FIG. 14 is repeated by the number of small regions.

In FIG. 14, the sensitivity setting portion 1062*d* calls the initial parameters for feature point candidate detection from the memory unit 104 and sets the initial parameters (S601). The initial parameters set herein include the initial scale parameter par_scale0, the initial evaluation threshold value par_v0, and the initial maximal property evaluation range par_maximum0, which have been described in the first embodiment of the present invention. The initial scale parameter par_scale0 is used for evaluation value calculation, the initial evaluation threshold value par_v0 is used for threshold value determination, and the initial maximal property evaluation range par_maximum0 is used for maximal property evaluation. However, the initial evaluation threshold value par_v0 is set to as small a value as possible. This is based on the assumption that the coordinates of points on the evaluation value map, which can become as many feature points as possible, are left during the feature point detection process, and points corresponding to the target point number from the coordinate having a large evaluation value are set to feature points.

After the initial parameter setting, the feature point detection section 1063 calculates an evaluation value for each coordinate (pixel) of the input image in the same manner as step S201, and generates an evaluation value map having the same resolution as the input image (S602).

After the evaluation value calculation, the feature point detection section 1063 performs threshold determination in the same manner as step S202 (S603). As described above, the initial evaluation threshold value par_v0 is set to a small value. Thus, the numbers of coordinates and evaluation values stored as the result of the threshold determination are increased more than in step S202.

After the threshold determination, the feature point detection section 1063 performs the same maximal property evaluation as step S203 (S604).

After the maximal property evaluation, the feature point detection section 1063 compares the number of feature points, which are set as feature points through the maximal property evaluation, to the target point number, and checks whether the number of feature points reaches the target point number (S605).

When it is checked in step S605 that the feature point number does not reach the target point number, the sensitivity setting portion 1062d determines whether the evaluation value needs to be recalculated (S606). In the determination of step S606, the sensitivity setting portion 1062d determines that the evaluation value does not need to be recalculated, when the maximal property evaluation was performed only once. When the maximal property evaluation was performed only once, it indicates that the maximal property evaluation was performed in the initial maximal property evaluation range par_maximum0. In this case, feature points can be detected through another maximal property evaluation process. In such a case, the maximal property evaluation is placed before the evaluation value calculation. As described above, the evaluation value calculation requires a higher calculation cost than the maximal property evaluation. Thus, as the maximal property evaluation is placed before the evaluation value calculation, it is possible to suppress an unnecessary increase of the calculation cost.

When it is determined in step S606 that the recalculation of the evaluation value is not needed, the sensitivity setting portion 1062d sets the maximal property evaluation range par_maximum_n to a smaller value than the initial maximal property evaluation range par_maximum0 (S608). Then, the feature point detection section 1063 performs the maximal property evaluation once again. As the feature point detection section 1063 performs another maximal property evaluation process in the maximal property evaluation range par_maximum_n, a larger number of feature points are expected to be detected.

When it is determined in step S606 that the recalculation of the evaluation value is needed, the sensitivity setting portion 1062d sets a scale parameter par_scale_n to a smaller value than the initial value (S607). Then, the feature point detection section 1063 performs the evaluation value calculation once again.

When it is determined at S605 that the feature point number reaches the target point number, the feature point detection section 1063 performs a feature point determination process (S609). In the feature point determination process, the feature point detection section 1063 reduces feature points of a small region, which exceed the target point number. The feature point detection section 1063 sorts the detected feature points according to the evaluation values, selects feature points corresponding to the target point number in a descending order of the evaluation values, and sets the selected feature points to the final feature points.

In step S606, whether the maximal property evaluation was performed once is set to a criterion for determining whether the evaluation value recalculation is needed. However, the number of maximal property evaluations is not limited to one. When the number is set to two or more, the maximal property evaluation range par_maximum_n is set to a value which decreases in steps from the initial value, when the sensitivity setting process of step S608 is performed, for example. Furthermore, in consideration of the calculation cost, the repetition number of the maximal property evaluation and the repetition number of the evaluation value calculation may be limited to a predetermined number.

According to the present embodiment, the feature point detection may be performed in such a manner that feature points are uniformly distributed on the image plane of the input image, without setting an expected point number.

In the fourth embodiment, an expected point number for each small region does not need to be set, but it is more cumbersome to set the detection sensitivity than in the first embodiment. Thus, the method of the first embodiment and the method of the fourth embodiment may be selectively used according to the use. Furthermore, although the fourth embodiment is an example related to the feature point detection, the method of the fourth embodiment may be applied to the matching point detection. In this case, the method of the third embodiment and the method of the fourth embodiment may be selectively used according to the use.

Fifth Embodiment

Next, a fifth embodiment of the present invention will be described. In the above-described embodiment, the entire input image is analyzed to set a target point number. The analysis for the input image includes the feature point candidate detection and the pixel dispersion calculation. In the fifth embodiment, however, a fixed target point number is preset, or a user sets an arbitrary target point number.

Figure 15:
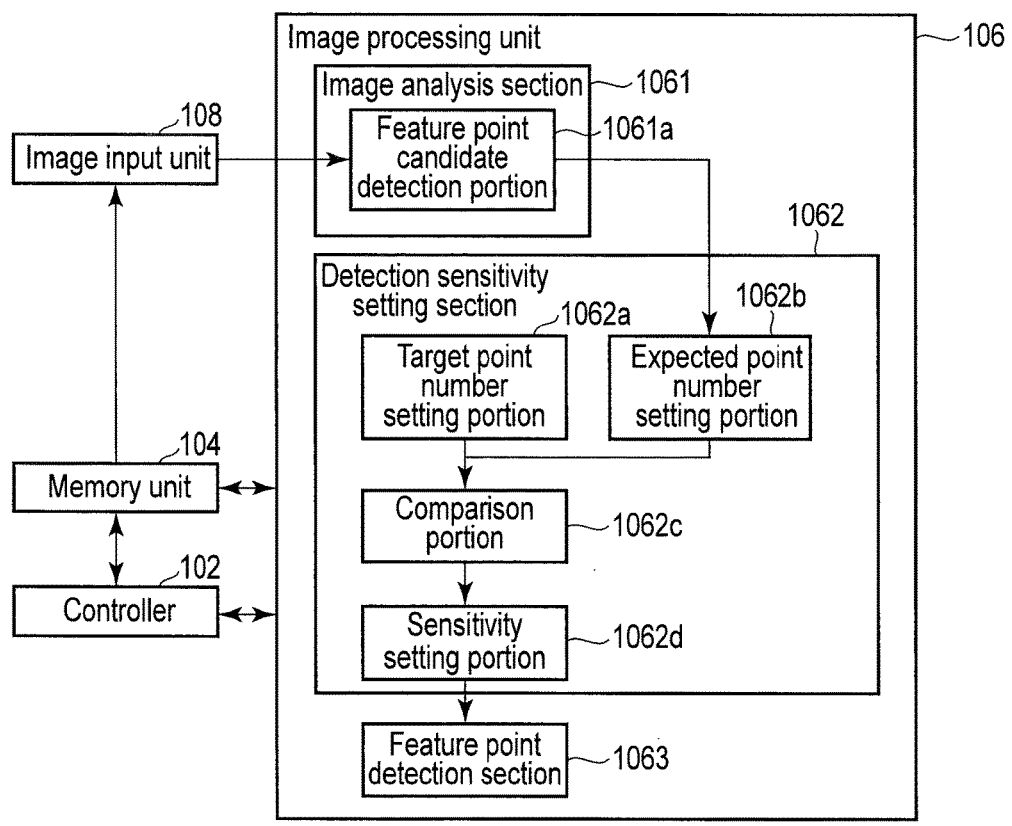
FIG. 15 is a block diagram illustrating the configuration of an image processing apparatus according to a fifth embodiment of the present invention.

FIG. 15 is a block diagram illustrating the configuration of an image processing apparatus according to a fifth embedment of the present invention. In FIG. 15, components corresponding to the components of FIG. 1 are represented by the same reference numerals as those of FIG. 1, and the descriptions thereof are omitted. The image processing apparatus of FIG. 15 is different from the image processing apparatus FIG. 1, only in that a feature point candidate detection portion 1061a and a target point number setting portion 1062a are not connected to each other.

FIG. 16 is a flowchart showing the entire processing flow of feature point detection in the image processing apparatus according to the fifth embedment of the present invention. Hereafter, the descriptions of the same processes as the first embodiment are omitted. That is, the descriptions of steps S11, S14, S15, S16, and S17 are omitted. Furthermore, in the feature point candidate detection process of step S12, feature point candidates of the entire input image are not detected, but only feature point candidates of each small region are detected, unlike the first embodiment. Thus, the detailed descriptions of step S12 are omitted herein.

In the fifth embodiment, the target point number setting portion 1062a sets a target point number by reading the value of a target point number which is previously stored in the memory unit 104, or acquiring a target point number set by a user (S13). Furthermore, when the target point number is set by the user, a user interface for the target point number needs to be set.

According to the above-described fifth embodiment, the target point number is set through a simple method. Thus, the feature point detection may be performed in such a manner that the feature points are uniformly distributed on the image plane of the input image.

Although a preferred embodiment of the present invention has been described for illustrative purposes, those skilled in the art will appreciate that various modifications, additions and substitutions are possible, without departing from the scope and the spirit of the invention as disclosed in the accompanying claims.

Furthermore, the processes illustrated in the methods or flowcharts in the image processing apparatuses according to the above-described embodiments may be stored as programs which can be executed by the controller 102. In addition to this, the processes may be stored in a memory medium of an external memory device such as a memory card (ROM card, RAM card or the like), a magnetic disk (floppy disk, hard disk or the like), an optical disk (CD-ROM, DVD or the like), or a semiconductor memory, and then distributed. Furthermore, the controller 102 may read the programs stored in the memory medium of the external memory device. According to the read program, the operation of the controller 102 may be controlled to execute the above-described processes.

What is claimed is:

1. An image processing apparatus comprising:
a processor comprising hardware, wherein the processor is configured to:
  acquire coordinates of feature points in an entire input image and coordinates of feature points in each of a plurality of small regions set in the input image, through image analysis;
  set a target point number for each small region, based on the coordinates of feature points in the entire input image, the target point number indicating the number of feature points which are to be detected during feature point detection;
  set an expected point number for each small region, based on the coordinates of feature points in the small region, the expected point number indicating the number of feature points which are expected to be detected in the small region during feature point detection;
  compare the target point number and the expected point number for each small region;
  set detection sensitivity during feature point detection for each small region, based on a comparison result between the target point number and the expected point number; and
  perform feature point detection according to the detection sensitivity set,
  wherein the processor is configured to acquire the coordinates of feature points in the entire input image by performing feature point candidate detection on the entire input image, and acquire the coordinates of features points in each small region by performing feature point candidate detection on the small region.

2. The image processing apparatus according to claim 1, wherein the processor is configured to acquire the distribution condition of feature points in the entire input image by calculating pixel dispersion of the entire input image, and acquire the distribution condition of feature points in each small region by calculating pixel dispersion of the small region.

3. The image processing apparatus according to claim 1, wherein the processor is configured to acquire the distribution condition of feature points in the entire input image by performing textural analysis for the entire input image, and acquire the distribution condition of feature points in each small region by performing textural analysis for the small region.

4. The image processing apparatus according to claim 1, wherein the processor is configured to repeat setting the detection sensitivity and performing the feature point detection until the expected point number reaches the target point number.

5. The image processing apparatus according to claim 1, wherein the processor is configured to increase the detection sensitivity for the small region of which the expected point number is smaller than the target point number.

6. An image processing apparatus comprising:
a processor comprising hardware, wherein the processor is configured to:
  acquire coordinates of matching points in all of a plurality of input images and coordinates of matching points in each of a plurality of small regions set in each of the input images, through image analysis;
  set a target point number for each small region, based on the coordinates of matching points in all of the input images, the target point number indicating the number of matching points which are to be detected during matching point detection;
  set an expected point number for each small region, based on the coordinates of matching points in each small region, the expected point number indicating the number of matching points which are expected to be detected in the small region during matching point detection;
  compare the target point number and the expected point number for each small region;
  set detection sensitivity during matching point detection for each small region, based on a comparison result between the target point number and the expected point number; and
  perform matching point detection according to the detection sensitivity set,
  wherein the processor is configured to acquire the coordinates of matching points in the entire input image by performing matching point candidate detection on the entire input image, and acquire the coordinates of matching points in each small region by performing matching point candidate detection on the small region.

7. The image processing apparatus according to claim 6, wherein the processor is configured to increase the detection sensitivity for the small region of which the expected point number is smaller than the target point number.

8. An image processing apparatus comprising:
a processor comprising hardware, wherein the processor is configured to:
  acquire a distribution condition of feature points in an entire input image through image analysis;
  set a target point number for each small region, based on the distribution condition of feature points in the entire input image, the target point number indicating the number of feature points which are to be detected during feature point detection;
set detection sensitivity during feature point detection; and
perform feature point detection according to the detection sensitivity set,
wherein the processor is configured to increase the detection sensitivity for the small region in which the number of feature points detected is smaller than the target point number, when the feature point detection is performed again,
wherein the processor is configured to repeat setting the detection sensitivity and performing the feature point detection until the number of feature points detected reaches the target point number,
wherein during the feature point detection, the processor is configured to perform evaluation value calculation to calculate an evaluation value corresponding to a value obtained by indicating the likelihood of a feature point in the input image as an index, perform threshold determination to compare the evaluation value to a predetermined threshold value, and perform maximal property evaluation to set a coordinate having an evaluation value, which is larger than the evaluation values of surrounding coordinates and equal to or more than the predetermined threshold value, to a feature point, and
wherein the processor is configured to determine whether the evaluation value calculation needs to be performed again on the small region in which the number of feature points detected does not reach the target point number, decrease a parameter which is used for the maximal property evaluation as the detection sensitivity when the evaluation value calculation does not need to be performed again, and decrease a parameter which is used for the evaluation value calculation as the detection sensitivity when the evaluation value calculation needs to be performed again.

9. An image processing apparatus comprising:
a processor comprising hardware, wherein the processor is configured to:
acquire coordinates of matching points in an entire input image through image analysis;
set a target point number for each small region, based on the coordinates of matching points in the entire input image, the target point number indicating the number of matching points which are to be detected during matching point detection;
set detection sensitivity during matching point detection; and
perform matching point detection according to the detection sensitivity set,
wherein the processor is configured to increase the detection sensitivity for the small region in which the number of matching points detected is smaller than the target point number, when the matching point detection is performed again,
wherein the processor is configured to repeat setting the detection sensitivity and performing the matching point detection until the number of matching points detected reaches the target point number,
wherein during the matching point detection, the processor is configured to perform evaluation value calculation to calculate an evaluation value corresponding to a value obtained by indicating the likelihood of a matching point in the input image as an index, perform threshold determination to compare the evaluation value to a predetermined threshold value, and perform minimal property evaluation to set a coordinate having an evaluation value, which is smaller than the evaluation values of surrounding coordinates and equal to or less than the predetermined threshold value, to a matching point, and
wherein the processor is configured to determine whether the evaluation value calculation needs to be performed again on the small region in which the number of matching points detected does not reach the target point number, decrease a parameter which is used for the maximal property evaluation as the detection sensitivity when the evaluation value calculation does not need to be performed again, and decrease a parameter which is used for the evaluation value calculation as the detection sensitivity when the evaluation value calculation needs to be performed again.

10. An image processing method comprising:
acquiring a distribution condition of feature points in an entire input image and coordinates of feature points in each of a plurality of small regions set in the input image, through image analysis;
setting a target point number for each small region, based on the coordinates of feature points in the entire input image, the target point number indicating the number of feature points which are to be detected during feature point detection;
setting an expected point number for each small region, based on the coordinates of feature points in the small region, the expected point number indicating the number of feature points which are expected to be detected in the small region during feature point detection;
comparing the target point number and the expected point number for each small region;
setting detection sensitivity during feature point detection for each small region, based on a comparison result between the target point number and the expected point number; and
performing feature point detection according to the set detection sensitivity,
wherein the method further comprises acquiring the coordinates of feature points in the entire input image by performing feature point candidate detection on the entire input image, and acquiring the coordinates of feature points in each small region by performing feature point candidate detection on the small region.

* * * * *